United States Patent

Martens et al.

[11] Patent Number: 5,990,371
[45] Date of Patent: Nov. 23, 1999

[54] PROCESS FOR THE SELECTIVE HYDROISOMERIZATION OF LONG LINEAR AND/OR SLIGHTLY BRANCHED PARAFFINS USING A CATALYST BASED ON A MOLECULAR SIEVE

[75] Inventors: Johan Martens, Huldenberg; Wim Souverijns, Hoogstraten; Rudy Parton, Winksele; Gilbert Froment, Deurle, all of Belgium; Eric Benazzi, Montesson, France; Nathalie George Marchal, Paris, France; Christian Marcilly, Houilles, France

[73] Assignee: Institut Francais du Petrole, France

[21] Appl. No.: 08/836,513

[22] PCT Filed: Sep. 5, 1996

[86] PCT No.: PCT/FR96/01364

§ 371 Date: May 5, 1997

§ 102(e) Date: May 5, 1997

[87] PCT Pub. No.: WO97/09397

PCT Pub. Date: Mar. 13, 1997

[30] Foreign Application Priority Data

Sep. 6, 1995 [FR] France ................................. 95 10424
Sep. 6, 1995 [FR] France ................................. 95 10425

[51] Int. Cl.$^6$ .............................. C07C 5/13; B01J 29/04; B01J 21/00

[52] U.S. Cl. ........................ 585/739; 585/740; 585/750; 585/751; 502/61; 502/64; 502/73; 502/74

[58] Field of Search .................................... 585/739, 740, 585/750, 751; 502/61, 64, 73, 74, 66

[56] References Cited

U.S. PATENT DOCUMENTS

| 4,705,674 | 11/1987 | Araya et al. ............................. 423/77 |
| 4,814,543 | 3/1989 | Chen et al. ............................. 585/739 |
| 5,135,638 | 8/1992 | Miller ..................................... 208/27 |
| 5,178,748 | 1/1993 | Casci et al. ............................. 208/46 |
| 5,282,958 | 2/1994 | Santilli et al. ......................... 208/111 |

FOREIGN PATENT DOCUMENTS

| 0 065 400 | 11/1982 | European Pat. Off. . |
| 0 103 981 | 3/1984 | European Pat. Off. . |
| 0 187 497 | 7/1986 | European Pat. Off. . |
| 92/01657 | 6/1992 | WIPO . |

*Primary Examiner*—Walter D. Griffin
*Assistant Examiner*—In Suk Bullock
*Attorney, Agent, or Firm*—Millen, White, Zelano & Branigan, P.C.

[57] ABSTRACT

The invention concerns a process for the selective hydroisomerisation of compounds containing at least one n-alkane chain containing more than 10 carbon atoms, in which the compound to be treated is brought into contact with a catalyst comprising at least one hydro-dehydrogenating element and at least one molecular sieve with a mono- or bidimensional pore network in which the openings of the accessible pores are delimited by 10 oxygen atoms, and the distance termed the bridge width between the pores is less than 0.70 nm, and in which the catalyst, when subjected to a standard n-heptadecane isomerization test, has a selectivity of at least 70% towards isomerized products for a conversion of 95%.

The sieve is preferably a NU-10, NU-23, NU-87, EU-13 or Theta-1 zeolite.

26 Claims, No Drawings ent application WO 92/01657 which
PROCESS FOR THE SELECTIVE HYDROISOMERIZATION OF LONG LINEAR AND/OR SLIGHTLY BRANCHED PARAFFINS USING A CATALYST BASED ON A MOLECULAR SIEVE

BACKGROUND OF THE INVENTION

The present invention concerns a process for selective hydroisomerisation of long (more than 10 carbon atoms), linear and/or slightly branched paraffins, in particular for high yield conversion of feeds with high pour points to at least one cut with a low pour point and a high viscosity index.

High quality lubricants are of fundamental importance for the efficient operation of modern machines, cars and trucks. However, the quantity of paraffins which directly originate from untreated crude and which have the properties to constitute good lubricants is very low when compared with the increasing demand in this sector.

Heavy oil fractions containing large amounts of linear or slightly branched paraffins must be treated to obtain good quality lubricant stock in the best possible yields. A dewaxing operation is used which is intended to eliminate the linear or very slightly branched paraffins from feeds which are then used as lubricant stock or as kerosine or jet fuel.

The linear or very slightly branched high molecular weight paraffins which are present in the oils, kerosine or jet fuel produce high pour points and thus lead to coagulation at low temperatures. To reduce the pour points, these linear or very slightly branched paraffins must be completely or partially eliminated.

The dewaxing operation can be effected by extraction using solvents such as propane or methyl ethyl ketone, using propane or methyl ethyl ketone (MEK) dewaxing. However, such techniques are costly, long and not always easy to carry out.

Catalytic dewaxing, as opposed to solvent dewaxing, is more economical and can produce products with the desired physico-chemical properties. This is achieved by selective cracking of the longest linear paraffin chains which leads to the formation of lower molecular weight compounds, a portion of which can be eliminated by distillation.

Because of their form-selectivity, zeolites are among the most widely used dewaxing catalysts. The idea that anticipated their use is that zeolite structures exist in which the pore openings are such that they allow long linear or very slightly branched paraffins to enter their microporosity but branched paraffins, naphthenes and aromatics are excluded. This phenomenon thus leads to selective cracking of linear or very slightly branched paraffins.

Zeolite based catalysts with intermediate pores such as ZSM-5, ZSM-11, ZSM-12, ZSM-22, ZSM-23, ZSM-35 and ZSM-38 have been described for use in catalytic dewaxing by cracking.

Processes using those zeolites can achieve dewaxing by cracking of feeds containing quantities of less than 50 weight % of linear or very slightly branched paraffins. However, with feeds containing higher quantities of these compounds, cracking leads to the formation of large quantities of lower molecular weight compounds such as butane, propane, ethane and methane, which considerably reduces the yield of the desired products.

In order to overcome these problems, we have concentrated our research on the development of catalysts (preferably non ZSM) which could bring about isomerisation of these compounds.

A number of patents exist in this field, for example International patent application WO 92/01657 which describes and claims a process for dewaxing feeds with isomerisation in the presence of a group VIII metal at a hydrogen pressure in the range 100 KPa to 21000 KPa and using a catalyst with a pore opening in the range 0.48 nm to 0.71 nm and in which the crystallite size is less than 0.5 $\mu$m. The catalyst leads to improved performances as regards yield with respect to prior art catalysts.

SUMMARY OF THE INVENTION

The invention provides a process for the selective hydroisomerisation of compounds containing at least one n-alkane chain containing more than 10 carbon atoms, in which the compound to be treated is brought into contact with a catalyst comprising at least one hydro-dehydrogenating element and at least one molecular sieve with a mono- or bidimensional pore network in which the openings of the accessible pores are delimited by 10 oxygen atoms, and the distance termed the bridge width between the pores is less than 0.70 nm, and in which the catalyst, when subjected to a standard n-heptadecane isomerisation test, has a selectivity of at least 70% towards isomerised products for a conversion of 95%.

Advantageously, the process can convert a feed with a high pour point to a mixture with a lower pour point and a high viscosity index.

The feed also comprises linear and/or slightly branched paraffins containing at least 10 carbon atoms, preferably 15 to 50 carbon atoms and advantageously 15 to 40 carbon atoms.

The process comprises the use of a catalyst comprising at least one molecular sieve having at least one pore type which has an opening delimited by 10 oxygen atoms and which are the largest type of pore in the structure which is accessible from the exterior. The pore network of the zeolite is mono- or bidimensional, preferably monodimensional.

The bridge width between two pore openings (of 10 oxygen atoms), as defined above, is less than 0.70 nm (1 nm=$10^{-9}$ m), preferably in the range 0.50 nm to 0.68 nm, more preferably in the range 0.52 nm to 0.65 nm. The crystallite size is preferably less than 2 $\mu$m (1 $\mu$m=$10^{-5}$ m), advantageously less than 1 $\mu$m and preferably 0.4 $\mu$m.

The catalyst is also characterized in that, for a conversion of the order of 95% by weight of n-heptadecane (n-C17), it results in a selectivity towards isomerised products of 70% or more, preferably at least 80%, under a standard n-C17 isomerisation test (SIT) which will be described below. The isomerised products generally contain between about 65% and 80% by weight of monobranched products and between about 20% and 35% by weight of multibranched products, essentially dibranched products. The term "monobranched products" denotes linear paraffins containing a single methyl group, and the term "dibranched products" denotes linear paraffins containing 2 methyl groups which are not carried by the same carbon atom. Multibranched products can also be defined by extension. The hydroisomerisation is thus selective.

The catalyst also comprises at least one hydrodehydrogenating function, for example a group VIII metal and/or a group VIB metal and/or rhenium and/or niobium, and the reaction is carried out under the conditions described below.

We have surprisingly discovered that one of the determining factors in obtaining high selectivities towards isomerised products is the use of molecular sieves which are characterized in that the opening of the largest pores is delimited by 10 oxygen atoms;

the bridge width must be less than 0.70 nm, preferably in the range 0.50 nm to 0.68 nm, more preferably in the range 0.52 nm to 0.65 nm.

This last point in particular is in contradiction to that claimed in the prior art patents cited above such as International application WO 92/01657 which has an essential feature a range of pore sizes to produce good yields of isomerised products.

The bridge width is measured using a molecular modelling and drawing method such as Hyperchem or Biosym which can construct the surface of the molecular sieves concerned and measure the bridge width using the ionic radii of the elements present in the sieve framework.

The use of the molecular sieves of the invention under the conditions described above can produce products with a low pour point and a high viscosity index in good yields.

DETAILED DESCRIPTION OF THE INVENTION

Molecular sieves of the invention which can be used for the isomerisation of linear or slightly branched paraffin hydrocarbons are zeolites, crystallised aluminosilicates such as Theta-1, NU-10, NU-23, EU-13, where the Si/Al ratio is best suited for the desired application. Also among zeolites of the invention is NU-87 zeolite which definitely has pores delimited by 10 and 12 oxygen atoms but where accessibility to the latter is via the pore openings with 10 oxygen atoms. Derivatives of the zeolites described above comprising at least one heteroatom in the zeolitic framework such as B, Fe, Ga or Zn are also included in the scope of the invention.

NU-10 zeolite used in the process of the invention and its synthesis method are described in European patent EP-A-0 077 624. That NU-10 zeolite is characterized by the following X ray diffraction table:

X ray diffraction table for NU-10 zeolite

| d(Å) | $I/I_0$ |
|---|---|
| 10.95 ± 0.25 | m to S |
| 8.80 ± 0.14 | w to m |
| 6.99 ± 0.14 | w to m |
| 5.41 ± 0.10 | w |
| 4.57 ± 0.09 | w |
| 4.38 ± 0.08 | VS |
| 3.69 ± 0.07 | VS |
| 3.63 ± 0.07 | VS |
| 3.48 ± 0.06 | m to S |
| 3.36 ± 0.06 | w |
| 3.31 ± 0.05 | w |
| 2.78 ± 0.05 | w |
| 2.53 ± 0.04 | m |
| 2.44 ± 0.04 | w |
| 2.37 ± 0.03 | w |
| 1.88 ± 0.02 | w | w=weak ($I/I_0$ between 0 and 20); m=medium ($I/I_0$ between 20 and 40); S=strong ($I/I_0$ between 40 and 60); VS=very strong ($I/I_0$ between 60 and 100).

NU-10 zeolite has a Si/Al atomic ratio in the range 8 to 1000.

It has been observed that the catalysts of the invention can be characterized in a catalytic test known as a standard isomerisation test (SIT) using pure n-heptadecane which is carried out at a partial pressure of 150 kPa of hydrogen and at a partial n-C17 pressure of 0.5 kPa, i.e., a total pressure of 150.5 kPa in a fixed bed and at a constant n-C17 flow rate of 15.4 ml/h using a catalyst mass of 0.5 g. The reaction is carried out in downflow mode. The degree of conversion is regulated by the temperature at which the reaction is carried out. The catalyst subjected to this test is constituted by pure pelletized zeolite and 0.5% by weight of platinum.

The sieve generally contains at least one hydro-dehydrogenating element, for example at least one group VIII metal, preferably at least one metal selected from the group formed by Pt or Pd, which is introduced into the molecular sieve by dry impregnation or ion exchange, for example, or using any other method which is known to the skilled person.

The concentration of hydro-dehydrogenating metal(s) introduced, expressed as the % by weight with respect to the mass of molecular sieve used, is generally less than 5% (0.01–5%), preferably less than 1% (0.01–1%) and generally of the order of 0.5% by weight. Under these conditions, a molecular sieve of the invention must produce, for a degree of conversion of n-C17 of the order of 95% by weight (the degree of conversion is regulated by the temperature) a selectivity towards isomerised products of 70% by weight or more, preferably at least 80% by weight.

The isomerisation selectivity in the standard n-C17 isomerisation test ($SIT_{n-C17}$) is defined as follows:

$$\text{Isomerisation selectivity (\%)} = \frac{\text{wt of isomerised } C_{17} \text{ products}}{\text{wt of isomerised } C_{17} \text{ products in test} + \text{wt of } C_{17-} \text{ products in test}} \times 100$$

leading to a n-C17 conversion of the order of 95%.

$C_{17-}$ products are compounds containing less than 17 carbon atoms regardless of their degree of branching.

When treating an actual feed, the molecular sieve of the invention is first formed. In a first variation, the molecular sieve can have at least one group VIII metal deposited on it, preferably selected from the group formed by platinum and palladium, and can then be formed using any technique which is known to the skilled person. In particular, it can be mixed with a matrix which is generally amorphous, for example a wet alumina gel powder. The mixture is then formed, for example by extrusion through a die. The amount of molecular sieve in the mixture obtained is generally in the range 0.5% to 99.9%, advantageously in the range 10% to 90% by weight with respect to the mixture (molecular sieve+matrix), preferably in the range 20% to 70%.

In the following text, the term "support" is used for the mixture of the molecular sieve+matrix.

Forming can be carried out with matrices other than alumina, such as magnesia, amorphous silica-aluminas, natural clays (kaolin, bentonite, sepiolite, attapulgite) and using other techniques such as pelletizing or bowl granulation.

The hydrogenating group VIII metal, preferably Pt and/or Pd, can also be deposited on the support using any process which is known to the skilled person for depositing a metal on a molecular sieve. A competing cation exchange technique can be used where the competitor is preferably ammonium nitrate, the competition ratio being at least about 20 and advantageously about 30 to 200. In the case of platinum or palladium, a platinum tetramine complex or a palladium tetramine complex is normally used: these latter are thus practically completely deposited on the molecular sieve. This cation exchange technique can also be used to deposit the metal directly onto molecular sieve powder before any mixing with a matrix.

Deposition of the group VIII metal (or metals) is generally followed by calcining in air or oxygen, usually between 300° C. and 600° C. for 0.5 to 10 hours, preferably between 350° C. and 550° C. for 1 to 4 hours. Reduction in hydrogen can then follow, generally at a temperature in the range 300° C. to 600° C. for 1 to 10 hours; preferably, in the range 350° C. to 550° C. for 2 to 5 hours.

The platinum and/or palladium can also be deposited not directly on the molecular sieve but on the alumina binder before or after the forming step, using anion exchange with hexachloroplatinic acid, hexachloropalladic acid and/or palladium chloride in the presence of a competing agent, for example hydrochloric acid. In general, after depositing the platinum and/or palladium, the catalyst is, as before, calcined as before then reduced in hydrogen as indicated above.

Advantageously, the feeds which can be treated using the process of the invention are fractions with relatively high pour points which latter it is desired to reduce.

The process of the invention can be used to treat various feeds from relatively light fractions such as kerosines and jet fuels up to feeds with higher boiling points such as middle distillates, vacuum residues, gas oils, middle distillates from FCC (LCO and HCO) and hydrocracking residues.

The feed to be treated is usually a C10+ cut with an initial boiling point of more than about 175° C. or a C20+ cut with an initial boiling point of more than 315° C., preferably a heavy cut with an initial boiling point of at least 380° C. The process of the invention is particularly suitable for the treatment of paraffinic distillates such as middle distillates which include gas oils, kerosines, jet fuel and all other fractions where the pour point and viscosity are to be adapted to bring them within specifications.

Feeds which can be treated using the process of the invention can contain paraffins, olefins, naphthenes, aromatics and also heterocycles, along with a large proportion of high molecular weight n-paraffins and very slightly branched high molecular weight paraffins, The reaction can be carried out such that the degree of cracking reactions remains sufficiently low to render the process economically viable. The number of cracking reactions is generally less than 20% by weight.

Typical feeds which can advantageously be treated in accordance with the invention generally have a pour point above 0° C., more usually above 15° C. The products resulting from treatment in accordance with the invention have pour points of less than 0° C., preferably less than about −10° C.

These feeds contain more than 30% and up to about 90%, and in some cases more than 90% by weight of high molecular weight n-paraffins (n-alkanes) containing more than 10 carbon atoms, and of paraffins containing more than 10 carbon atoms which are very slightly branched and also of high molar weight. The process is of particular importance when this proportion is at least 60% by weight.

Non limiting examples of other feeds which can be treated in accordance with the invention are bases for lubricating oils, synthesised paraffins from the Fischer-Tropsch process, polyalphaolefins with high pour points, synthesised oils, etc. The process can also be applied to other compounds containing an n-alkane chain as defined above, for example n-alkylcycloalkane compounds, or containing at least one aromatic group.

The operating conditions under which the hydroisomerisation of the invention is carried out are as follows:

the reaction temperature is in the range 170° C. to 500° C., preferably in the range 180° C. to 450° C., advantageously 180–400° C.;

the pressure is in the range 1 bar to 250 bar, preferably in the range 10 bar to 200 bar;

the hourly space velocity (vvh, the volume of feed injected per unit volume of catalyst per hour) is in the range about 0.05 h$^{-1}$ to about 100 h$^{-1}$, preferably in the range about 0.1 h$^{-1}$ to about 30 h$^{-1}$.

The feed and the catalyst are brought into contact in the presence of hydrogen. The quantity of hydrogen used, expressed in liters of hydrogen per liter of feed, is in the range 50 liters to about 2000 liters of hydrogen per liter of feed, preferably in the range 100 liters to 1500 liters of hydrogen per liter of feed.

The feed to be treated preferably has a nitrogen compound concentration of less than about 200 ppm by weight, preferably less than 100 ppm by weight. The sulphur concentration is less than 1000 ppm by weight, preferably less than 500 ppm, and more preferably less than 200 ppm by weight. The concentration of metals such as Ni or V in the feed is extremely low, i.e., less than 50 ppm by weight, preferably less than 10 ppm by weight and more preferably less than 2 ppm by weight.

The compounds obtained by the process of the invention are essentially monobranched, dibranched and multibranched with methyl groups. As an example, in the case of a feed constituted by pure n-heptadecane (n-C17), methylhexadecane compounds are selectively obtained, mainly 2-methylhexadecane, also the dibranched compounds 2,7-; 2,8-; 2,9-; 2,10-; and 2,11-dimethylpentadecane. The total of the isomerised products represents more than 70% by weight of the products obtained, with 95% conversion. The isomerised carbon atoms are separated by a distance of at least the bridge width.

The following examples illustrate the invention without in any way limiting its scope. They are given for a feed constituted by n-heptadecane (standard isomerisation test, SIT), or for a hydrocracking residue.

EXAMPLES

Example 1

Catalyst C1, in Accordance with the Invention

The starting material was a NU-10 zeolite in its H form with a global Si/Al ratio of about 30, a pore opening delimited by 10 oxygen atoms and a bridge width, i.e., the distance between two pore openings, of 0.55 nm. The crystallites of the NU-10 zeolite were in the form of needles less than 1 µm in length and a width in the range 0. 1 µm to 0.4 µm.

The NU-10 zeolite was dry impregnated with a solution of [Pt(NH$_3$)$_4$]Cl$_2$ to obtain, after calcining and reduction at 450° C., a Pt content of 0.5% by weight of platinum on the zeolite.

0.5 g of this platinum-charged zeolite, which had been pelletized (200 µm to 300 µm granulometric fraction) was introduced into a fixed bed reactor.

The standard n-heptadecane isomerisation test (SIT) was then carried out at a partial pressure of 150 kPa of hydrogen and a partial pressure of 0.5 kPa of n-C17, i.e., a total pressure of 150.5 kPa, on a fixed bed with a constant n-C17 downflow rate of 15.4 ml/h and a catalyst mass of 0.5 g. The degree of conversion was regulated by the temperature at which the reaction was carried out.

In this example, the temperature required to achieve 95% by weight conversion of n-C17 was 190° C. At this temperature, the selectivity for isomerised products was 93% by weight. The selectivity is defined as follows:

Isomerisation selectivity (%) =

$$\frac{\text{wt of isomerised } C_{17} \text{ products (monobranched+ multibranched) in test}}{\text{wt of isomerised } C_{17} \text{ products in test + wt of } C_{17} \text{ products in test}} \times 100$$

The selectivity towards monobranched compounds was 67.4% and for multibranched compounds it was 25.6%.

Example 2
Catalyst C2, Not in Accordance with the Invention

The starting material was a USY zeolite in its H form with a global Si/Al ratio of about 5, a pore opening delimited by 12 oxygen atoms and a bridge width, i.e., the distance between two pore openings, of more than 0.7 nm.

The USY-H zeolite was dry impregnated with a solution of [Pt(NH$_3$)$_4$]Cl$_2$ to obtain, after calcining and reduction at 450° C., a Pt content of 0.5% by weight of platinum on the zeolite.

0.5 g of this platinum-charged zeolite, which had been pelletized (200 μm to 300 μm granulometric fraction) was introduced into a fixed bed reactor.

The standard n-heptadecane isomerisation test (SIT) was then carried out at a partial pressure of 150 kPa of hydrogen and a partial pressure of 0.5 kPa of n-C17, i.e., a total pressure of 150.5 kPa, on a fixed bed with a constant n-C17 downflow rate of 15.4 ml/h and a catalyst mass of 0.5 g. The degree of conversion was regulated by the temperature at which the reaction was carried out.

In this example, the temperature required to achieve 95% by weight conversion of n-C17 was 220° C. At this temperature, the selectivity for isomerised products was only 16% by weight. The selectivity is defined as in Example 1.

The standard isomerisation test is thus a means of selecting catalysts.

Example 3
In Accordance with the Invention

The zeolite used in this example was the same NU-10 zeolite as that used in Example 1.

The zeolite was milled with SB3 type alumina provided by Condea. The milled paste was extruded through a 1.2 mm diameter die. The extrudates were calcined at 500° C. for 2 hours in air then dry impregnated with a tetramine platinum chloride solution [Pt(NH$_3$)$_4$]Cl$_2$, then calcined in air at 550° C. The platinum content in the final catalyst C3 was 0.7% by weight and the zeolite content, with respect to the whole catalyst mass, was 60% by weight.

Evaluation of Catalyst C3 in Hydroisomerisation of a Hydrocracking Residue from a Vacuum Distillate.

The characteristics of the feed were as follows:

| | |
|---|---|
| Sulphur content (ppm by weight) | 12 |
| Nitrogen content (ppm by weight) | 2 |
| Pour point (° C.) | +30 |
| Initial boiling point | 104 |
| 5% | 325 |
| 10% | 385 |
| 50% | 452 |
| 90% | 520 |
| 95% | 536 |
| End point | 573 |

The prepared catalyst was then used to prepare a lubricant stock by hydroisomerisation of the above feed.

The catalyst was first reduced in hydrogen at 450° C. before the catalytic test, in situ in the reactor. Reduction was carried out in stages. It consisted of a 2 hour stage at 150° C., then raising the temperature to 450° C. at 1° C./min, then a 2 hour stage at 450° C. During this reduction procedure, the hydrogen flow rate was 1000 liters of H$_2$ per liter of catalyst.

The reaction was carried out at 300° C. at a total pressure of 12 MPa, an hourly space velocity of 0.9 h$^{-1}$ and a hydrogen flow rate of 1000 liters of H$_2$ per liter of feed. Under these operating conditions, the gross conversion of 400- was 65% and the lubricant stock yield was 86%.

The characteristics of the oil after hydroisomerisation are shown in the table below.

| | |
|---|---|
| Viscosity index VI | 136 |
| Pour point | −18 |
| Oil/feed yield (% by weight) | 86 |

This example shows the importance of using a catalyst of the invention which can reduce the pour point of the initial feed for a hydrocracking residue, while retaining a high viscosity index (VI).

The present invention has been illustrated with the aim of producing an oil, but other aims can be achieved. In general, the invention can be used to produce multiple, localized branching.

We claim:

1. A process for the selective hydroisomerisation of compounds containing at least one n-alkane chain containing more than 10 carbon atoms, in which said compound to be treated is brought into contact with a catalyst comprising at least one hydro-dehydrogenating element and at least one molecular sieve with a mono- or bidimensional pore network in which the openings of the accessible pores are delimited by 10 oxygen atoms, and the distance termed the bridge width between the pores is less than 0.70 nm, the molecular sieve is NU-23, NU-87 or EU-13 and in which said catalyst, when subjected to a standard n-heptadecane isomerisation test, has a selectivity of at least 70% towards isomerised products for a conversion of 95%.

2. A process according to claim 1, in which the bridge width is in the range 0.50 nm to 0.68 nm.

3. A process according to claim 1, in which the bridge width is in the range 0.52 nm to 0.65 nm.

4. A process according to claim 1, in which the molecular sieve has a crystallite size of less than 2 μm.

5. A process according to claim 1, in which the molecular sieve has a crystallite size of less than 1 μm.

6. A process according to claim 1, in which the molecular sieve has a crystallite size of less than 0.4 μm.

7. A process according to claim 1, in which the molecular sieve is NU-23.

8. A process according to claim 1, in which the molecular sieve is NU-87.

9. A process according to claim 1, in which the molecular sieve is EU-13.

10. A process according to claim 1, in which the hydro-dehydrogenating element is selected from the group consisting of group VIII metals, group VIB metals, rhenium and niobium.

11. A process according to claim 1, in which the catalyst contains a matrix, and 0.5–99.9% by weight of molecular sieve, with respect to the mixture of matrix and sieve, and less than 5% by weight of hydro-dehydrogenating metal with respect to the sieve.

12. A process according to claim 11, in which the catalyst contains 10%–90% by weight of sieve with respect to the mixture of matrix and sieve.

13. A process according to claim 1, in which the pressure is in the range 1 bar to 250 bars, the temperature is in the range 170° C. to 500° C., the hourly space velocity is in the range 0.05 h$^{-1}$ to 100 h$^{-1}$, and the hydrogen concentration is in the range 50 liters to 2000 liters of hydrogen/liters of feed.

14. A process according to claim 13, in which the temperature is in the range 180–450° C.

15. A process according to claim 14, in which the pressure is in the range 10 bars to 200 bars.

16. A process according to claim 15, in which the hydrogen concentration is in the range 100 liters to 1500 liters of hydrogen/liter of feed.

17. A process according to claim 1, in which the compound to be treated in selected from the group consisting of n-alkanes, n-alkylcycloalkanes and compounds containing at least one aromatic group.

18. A process according to claim 1, in which the compound to be treated is present in a feed with an initial boiling point of more than 175° C.

19. A process according to claim 1, in which the compound to be treated is present in a feed with an initial boiling point of at least 380° C.

20. A process according to claim 1, in which the compound to be treated comprises an n-alkane chain containing 15 to 50 carbon atoms.

21. A process according to claim 1, in which the compound to be treated comprises an n-alkane chain containing 15 to 40 carbon atoms.

22. A process according to claim 1, in which the compound to be treated is present in a hydrocarbon feed selected from the group formed by middle distillates, vacuum residues, hydrocracking residues, paraffins from the Fischer-Tropsch process, synthesised oils, gas oil cuts, middle distillates from FCC, lubricant stocks, and polyalphaolefins.

23. A process for the selective hydroisomerisation of compounds containing at least one n-alkane chain containing more than 10 carbon atoms, in which said compound to be treated is brought into contact with a catalyst comprising at least one hydro-dehydrogenating element and at least one molecular sieve with a mono- or bidimensional pore network in which the openings of the accessible pores are delimited by 10 oxygen atoms, and the distance termed the bridge width between the pores is less than 0.70 nm, the molecular sieve is Nu-23, Nu-87 or Eu-13, and contains boron, gallium or zinc, and in which said catalyst, when subjected to a standard n-heptadecane isomerisation test, has a selectivity of at least 70% towards isomerised products for a conversion of 95%.

24. A process for the selective hydroisomerisation of compounds containing at least one n-alkane chain containing more than 10 carbon atoms, in which said compound to be treated is brought into contact with a catalyst comprising at least one hydro-dehydrogenating element and at least one molecular sieve with a mono- or bidimensional pore network in which the openings of the accessible pores are delimited by 10 oxygen atoms, and the distance termed the bridge width between the pores is less than 0.70 nm, the molecular sieve is Eu-13, and in which said catalyst, when subjected to a standard n-heptadecane isomerisation test, has a selectivity of at least 70% towards isomerised products for a conversion of 95%.

25. A process according to claim 24, wherein the molecular sieve contains B, Ga or Zn.

26. A process for the selective hydroisomerisation of compounds containing at least one n-alkane chain containing more than 10 carbon atoms, in which said compound to be treated is brought into contact with a catalyst comprising at least one hydro-dehydrogenating element and at least one molecular sieve with a mono- or bidimensional pore network in which the openings of the accessible pores are delimited by 10 oxygen atoms, and the distance termed the bridge width between the pores is less than 0.70 nm, the molecular sieve is Nu-10 containing boron, and in which said catalyst, when subjected to a standard n-heptadecane isomerisation test, has a selectivity of at least 70% towards isomerised products for a conversion of 95%.

* * * * *